US012018468B2

(12) United States Patent
Chung

(10) Patent No.: US 12,018,468 B2
(45) Date of Patent: Jun. 25, 2024

(54) ARTICULATING SHOWER ASSEMBLY

(71) Applicant: KOHLER CO., Kohler, WI (US)

(72) Inventor: Chanseol Chung, Milwaukee, WI (US)

(73) Assignee: KOHLER CO., Kohler, WI (US)

( * ) Notice: Subject to any disclaimer, the term of this patent is extended or adjusted under 35 U.S.C. 154(b) by 336 days.

(21) Appl. No.: 17/306,413

(22) Filed: May 3, 2021

(65) Prior Publication Data

US 2021/0348369 A1 Nov. 11, 2021

Related U.S. Application Data

(60) Provisional application No. 63/021,717, filed on May 8, 2020.

(51) Int. Cl.
*E03C 1/04* (2006.01)
*B05B 15/68* (2018.01)

(52) U.S. Cl.
CPC ............ *E03C 1/0408* (2013.01); *B05B 15/68* (2018.02); *E03C 2001/0414* (2013.01)

(58) Field of Classification Search
CPC ........... E03C 1/0408; E03C 2001/0414; E03C 1/0409; E03C 1/066; E03C 1/06; B05B 15/68; B05B 15/652; A47K 3/28
See application file for complete search history.

(56) References Cited

U.S. PATENT DOCUMENTS 2,776,168 A * 1/1957 Schweda .................. E03C 1/06 4/596
4,282,612 A * 8/1981 King ......................... E03C 1/06 4/596
4,975,993 A * 12/1990 Black .................... B05B 15/652 4/615
8,122,528 B2 * 2/2012 Heisterhagen ........ E03C 1/0408 4/567

(Continued)

FOREIGN PATENT DOCUMENTS

CH 340460 A 8/1959
CN 200958227 Y 10/2007

OTHER PUBLICATIONS

Extended European Search Report on EP Appl. Ser. No. 21172468.7 dated Jan. 14, 2022 (13 pages).

(Continued)

*Primary Examiner* — Qingzhang Zhou
(74) *Attorney, Agent, or Firm* — FOLEY & LARDNER LLP

(57) ABSTRACT

An articulating shower assembly in provided. The articulating shower assembly includes a linkage assembly operable between a first position and a second position. A spray head is coupled to the linkage assembly and is operable between the first position and the second position. A handle is pivotally coupled to the linkage assembly such that the linkage assembly is configured to transition between the first position and the second position in response to a force (Continued)

applied to the handle. In some embodiments, the linkage assembly includes a first link arm, a second link arm, and a pivot body, where the pivot body is fluidly coupled to the spray head. The first link arm may be rigid while the second link arm is structured to extend and collapse as the linkage assembly transitions between the first position and the second position.

20 Claims, 4 Drawing Sheets

(56) References Cited

U.S. PATENT DOCUMENTS

| | | | | |
|---|---|---|---|---|
| 2005/0132488 | A1* | 6/2005 | Biondo | E03C 1/06 4/541.1 |
| 2015/0136245 | A1 | 5/2015 | Hong | |

OTHER PUBLICATIONS

First Chinese Office Action on CN Appl. Ser. No. 202110501261.1 dated May 7, 2022 (18 pages).
Partial European Search Report on EP Appl. Ser. No. 21172468.7 dated Oct. 7, 2021 (14 pages).

* cited by examiner

ARTICULATING SHOWER ASSEMBLY

CROSS-REFERENCE TO RELATED PATENT APPLICATION

This application claims the benefit of and priority to U.S. Provisional Application No. 63/021,717, filed on May 8, 2020, the entire disclosure of which is incorporated by reference herein.

BACKGROUND

The present disclosure relates generally to shower systems. More specifically, the present disclosure relates to a shower system including an articulating assembly, a height-adjustable spray head, and a detachable handheld sprayer.

SUMMARY

At least one embodiment relates to an articulating shower assembly. The articulating shower assembly includes a linkage assembly, a spray head, and a handle. The linkage assembly is configured to be operable in a plurality of positions. The spray head is coupled to the linkage assembly and is operable in the plurality of positions. And the handle is pivotally coupled to the linkage assembly. The linkage assembly is configured to transition between the plurality of positions responsive to a force applied to the handle.

Another embodiment relates to an articulating shower assembly. The articulating shower assembly includes a linkage assembly, a spray head, and a handle. The linkage assembly is configured to be operable in a first portion and a second positon and the spray head is coupled to the linkage assembly. The handle includes a first handle portion and a second handle portion. The first handle portion is pivotally coupled to the linkage assembly and the second handle portion is removably and fluidly coupled with the first handle portion.

Another embodiment relates to an articulating shower assembly. The articulating shower assembly includes a linkage assembly operable in a first position and a second position, a spray head, and a handle. The linkage assembly includes a pivot body, a first link, and a second link. The first link is pivotally coupled of the pivot body and is configured to be pivotally coupled to a wall. The second link is pivotally coupled to the pivot body and is configured to be pivotal coupled to the wall. The spray head is fluidly coupled to the pivot body, and the handle is pivotally coupled to the second link. The linkage assembly is configured to transition between the first position and the second position responsive to a force applied to the handle.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

Figure 1:
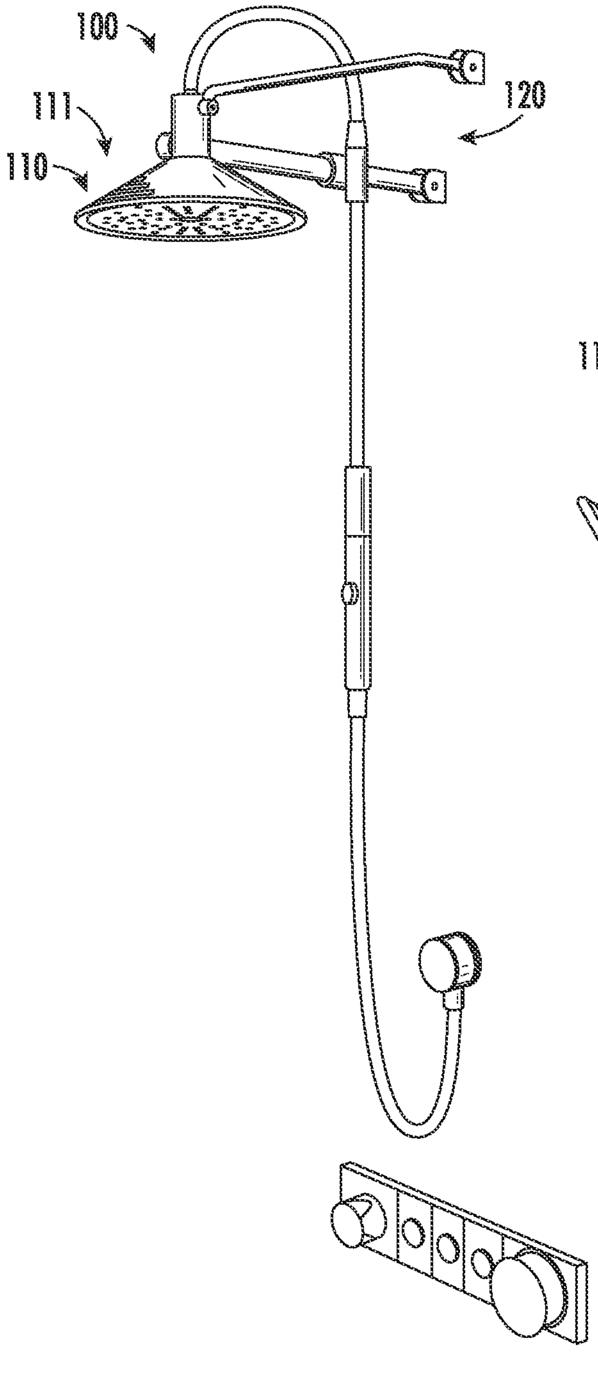
FIG. 1 is a front perspective view of an articulating shower assembly according to an example embodiment.

It will be recognized that some or all of the Figures are schematic representations for purposes of illustration. The Figures are provided for the purpose of illustrating one or more implementations with the explicit understanding that they will not be used to limit the scope or the meaning of the claims.

DETAILED DESCRIPTION

Before turning to the FIGURES, which illustrate certain exemplary embodiments in detail, it should be understood that the present disclosure is not limited to the details or methodology set forth in the description or illustrated in the FIGURES. It should also be understood that the terminology used herein is for the purpose of description only and should not be regarded as limiting. Below are more detailed descriptions of various concepts related to, and implementations of, methods, apparatuses, and for showers having an articulating shower assembly. The various concepts introduced above and discussed in greater detail below may be implemented in any of a number of ways, as the described concepts are not limited to any particular manner of implementation. Examples of specific implementations and applications are provided primarily for illustrative purposes.

Generally speaking, conventional spray heads have a fixed position within a shower environment. These spray heads are not typically adjustable or moveable relative to the user. For some users, conventional spray heads may be mounted too high above their heads, making it difficult for these users to reach the spray head. Thus, it would be desirable to have a spray head that may be adjusted by users who may be unable to reach the spray head, while still affording taller users the option of adjusting the height of the spray head to meet their needs.

Some conventional shower systems may include an overhead spray head (e.g., rainhead, etc.) and a shower wand (e.g., handheld sprayer), each including an assembly of internally moving mechanical parts behind a spray face (e.g., within the spray head or shower wand) to provide different spray patterns and spray modes, such as impellers or other moving parts. In some embodiments, the user may operate a diverter and select that water either flow through the overhead sprayer, the handheld sprayer, or both at the same time. Due to the amount of moving parts involved in such a system, mechanical failure caused by calcium and lime build-up may cause these components to fail. Further, these systems can be expensive as they include two different sprayers, two lengths of piping, and a diverter.

Some conventional shower systems, such as those that include both a handheld sprayer and an overhead sprayer, may include a diverter that selectively facilitates a flow of water between the overhead sprayer and the handheld sprayer. For example, if a user were using the rainhead sprayer and wished to switch the flow of water to the handheld sprayer, the user may operate a diverter to facilitate the switch. However, while the handheld sprayer is in use, water may sit within a conduit between the rainhead sprayer and the diverter, slowly cooling down to undesirably low temperatures (e.g., room temperature). Thus, when the user switched the flow of water back to the rainhead sprayer, the initial water that exits the rainhead sprayer may be uncomfortably cold for the user, as the water has been sitting within the conduit while the user was using the handheld sprayer.

It would be advantageous to provide a shower system including a spray head and a shower wand that can overcome the above-noted limitations associated with conventional shower systems, so as to provide for an improved user experience.

As will be discussed in greater detail below, an articulating shower system (e.g., shower system) may include a spray head pivotally coupled (e.g., rotatably coupled, etc.) to a linkage assembly within a shower environment. The spray head may be coupled to a linkage assembly in a position above a user's head. The linkage assembly may facilitate selective positioning of the spray head relative to a user of the articulating shower system. For example, the linkage assembly may be configured to position the spray head between a first position and a second position. The linkage assembly may be selectively articulated by a user when the user interfaces with any of the spray head, the linkage assembly, or a handle coupled to the linkage assembly In the first position, for example, the spray head may spray straight down (e.g., parallel to a wall of the shower environment). In the second position, for example, the spray head may spray in a direction generally away from the wall and toward the center of the shower environment. The spray head may also be selectively positioned at a position between the first position and the second positon. Articulation of the linkage, and thus the spray head, may be effected by pulling down on a handle or solid pipe pivotally coupled to the linkage. The first position and the second position are referred to as example positions and are not intended to be limiting in scope. In some embodiments, a shower head swivel ball adaptor allows the spray head to be positioned independently from the linkage assembly.

Referring to FIG. 1, an articulating shower assembly 100 is shown according to an exemplary embodiment. The articulating shower assembly 100 includes a spray head 110 and a linkage assembly 120. The articulating shower assembly 100, and more specifically the linkage assembly 120, may be coupled to a wall 130 (e.g., a vertical surface, a near-vertical surface, etc.) within a shower environment. The linkage assembly 120 is configured to be selectively positionable (e.g., operable) between a plurality of positions. For example, the linkage assembly 120 may be configured to be selectively positionable between a first position and a second position. As shown in FIG. 1, the articulating shower assembly 100 is in the first position. In the first position, the linkage assembly 120 may position the spray head 110 to face in a direction parallel to the wall 130 and toward the ground (e.g., floor, earth, etc.). This may be desirable as it may provide a user of the articulating shower assembly 100 a spray of water from overhead (e.g., a rainhead sprayer, an overhead sprayer, etc.).

Figure 2:
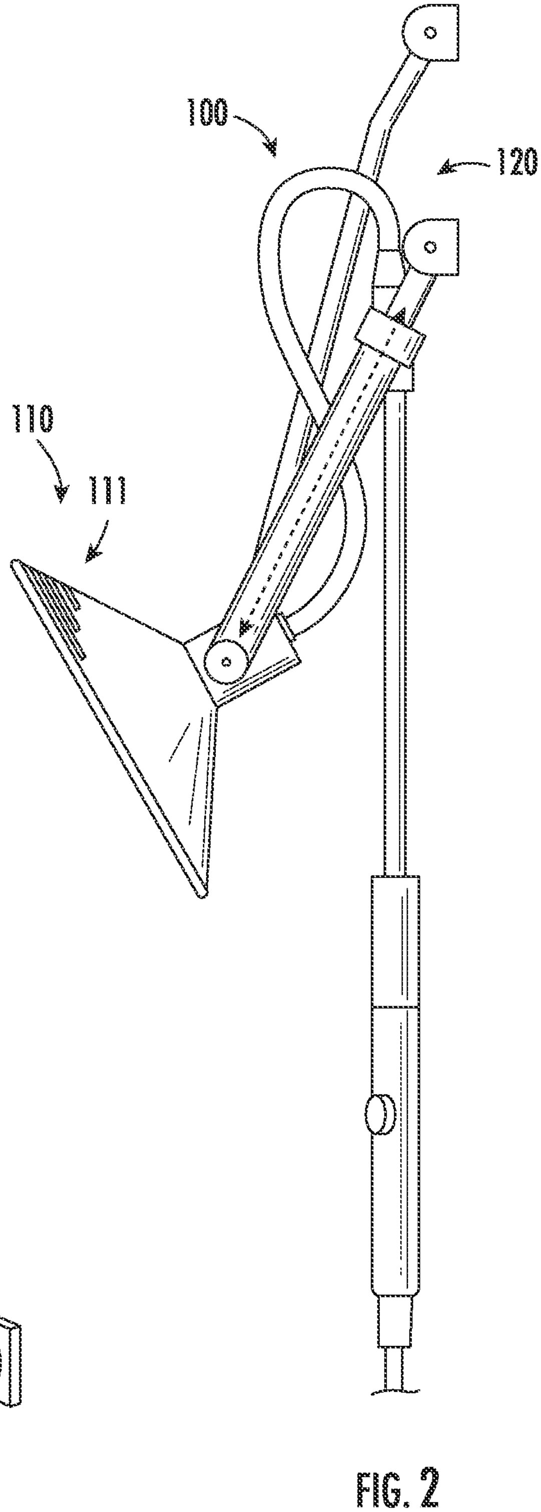
FIG. 2 is a detail view of the articulating shower assembly of FIG. 1.

As shown in FIG. 2, the articulating shower assembly 100 is in the second position. In the second position, the linkage assembly 120 may position the spray head 110 to face in a direction generally away from the wall 130. In facilitating movement of the spray head 110 from the first position to the second position, the linkage assembly 120 may change a height of the spray head 110 relative to the ground. A user of the articulating shower assembly 100 may interface with the spray head 110 to transition the spray head 110 between the first position and the second position. For example, when the spray head 110 is in the first position, the user may apply a force to the spray head 110 (e.g., pull on the spray head 110 in a direction generally toward the ground) to transition the spray head 110 to the second position. When the spray head 110 is in the second position, the user may apply an upward force on the spray head 110 to transition the spray head 110 to the first position. In some embodiments, the spray head 110 may be moved between a plurality of positions between the first position and the second position.

The spray head 110 may further include a grip 111 that a user may interface with when applying a force to the spray head 110 to transition the spray head 110 between the first position and the second position. The grip 111 may be formed of a rubber, elastomer, or other material that provides a surface texture for a user to grip if and when the user has wet hands.

Figure 3:
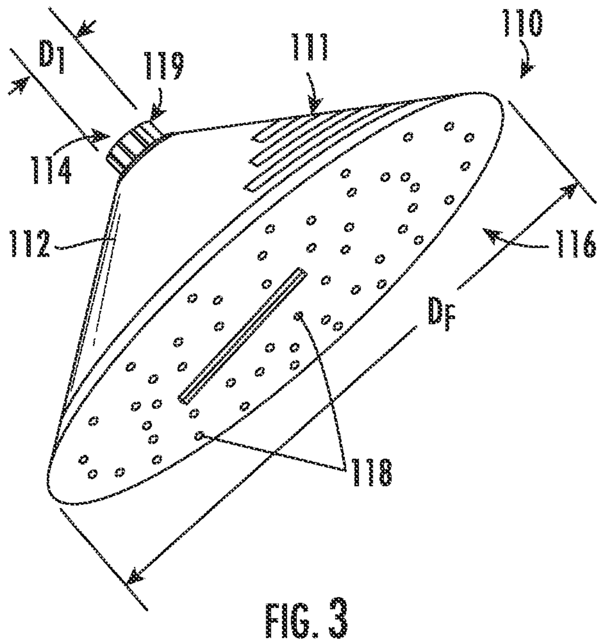
FIG. 3 is perspective view of a portion of the articulating shower assembly of FIG. 1.

As shown in FIG. 3, the spray head 110 includes a spray housing 112, a spray inlet 114, and a spray face 116. The spray head 110 is configured to receive a flow of water via the spray inlet 114 and discharge the flow of water via the spray face 116. The spray face 116 may be a generally planar and generally annular body formed of plastic, metal, an elastomer, a polymer, or a similar material or combinations of materials. In some embodiments, the spray face 116 includes a plurality of holes 118 (e.g., apertures, orifices, etc.) which allow for the passage of the flow of water. The plurality of holes 118 may be positioned (e.g., profiled) about the spray face 116 to manipulate the flow of water exiting from the spray head 110 into a pattern, such as "mist", "shower", "massage", or similar spray patterns. The plurality of holes 118 may be small and round, or large and oblong. In some embodiments, the spray face 116 is rotatable relative to the spray housing 112 such that rotation of the spray face 116 changes the spray pattern of the water exiting from the spray head 110.

The spray housing 112 may define a frustoconical shape, tapering from the largest diameter proximate the spray face 116, shown as a face diameter DF, to the smallest diameter proximate the spray inlet 114, shown as an inlet diameter $D_1$. The spray housing 112 may be manufactured from a single body formed of plastic, metal, metal alloys, wood, elastomers, polymers, or similar materials or combinations of materials. In some embodiments, the spray housing 112 is formed of a material that is corrosion-resistant or corrosion-proof such that the spray housing 112 does not corrode when in damp environments for long periods of time. Within the spray housing 112, and in fluid communication with both the spray inlet and the spray face 116, may be a diverter, a digital diverter, or similar component configured to electronically change the spray pattern exiting the spray head 110, such as by rotating the spray face 116 or actuating a component of the digital diverter. In some embodiments, the spray pattern may be changed by a user sending electronic instructions to the digital diverter to change the spray pattern.

The spray head 110 may be removably coupled to the linkage assembly 120. According to the exemplary embodiment of FIG. 2, the spray head 110 is removably coupled to the linkage assembly 120 by forming a threaded connection with the linkage assembly 120. The spray head 110 may include spray threads 119, positioned proximate the spray inlet 114, and allowing the removal of the spray head 110 from the linkage assembly 120 such that the spray head 110 may be cleaned, replaced, or repaired. According to other exemplary embodiments, the spray head 110 is removably coupled to the linkage assembly 120 using latches, such as bayonet latches. In some embodiments, the spray head 110 is welded, glued, molded, adhered, or fastened to the linkage assembly 120. For example, the spray head 110 may be integrally formed with a component of the linkage assembly 120. The spray threads 119 cooperate with the linkage assembly 120 to form a watertight seal between the linkage assembly 120 and the spray threads 119. The spray threads 119 may be formed of plastic, metal, a polymer, epoxy, or a similar material. The spray threads 119 may be structured such that they can withstand periodic loading caused by user interaction with the spray head 110. In some embodiments, a user may interface with the spray head 110 directly to move the spray head 110 between the first position and the second position. Thus, the spray threads 119 may be structured to withstand the moments and forces associated with such interactions, such as by forming the spray threads 119 from a strong material (e.g., metal) or by adjusting the pitch, the major diameter, and the minor diameter of the spray threads 119.

In some embodiments, the spray threads 119 are configured to accept a plumbing joint, such as a shower head swivel ball adaptor. The shower head swivel ball adaptor may be coupled to the linkage assembly 120 such that the spray head 110 is positionable relative to the linkage assembly 120. The shower head swivel ball adaptor may allow the spray head 110 to rotate and swivel relative to the linkage assembly 120.

Figure 4:
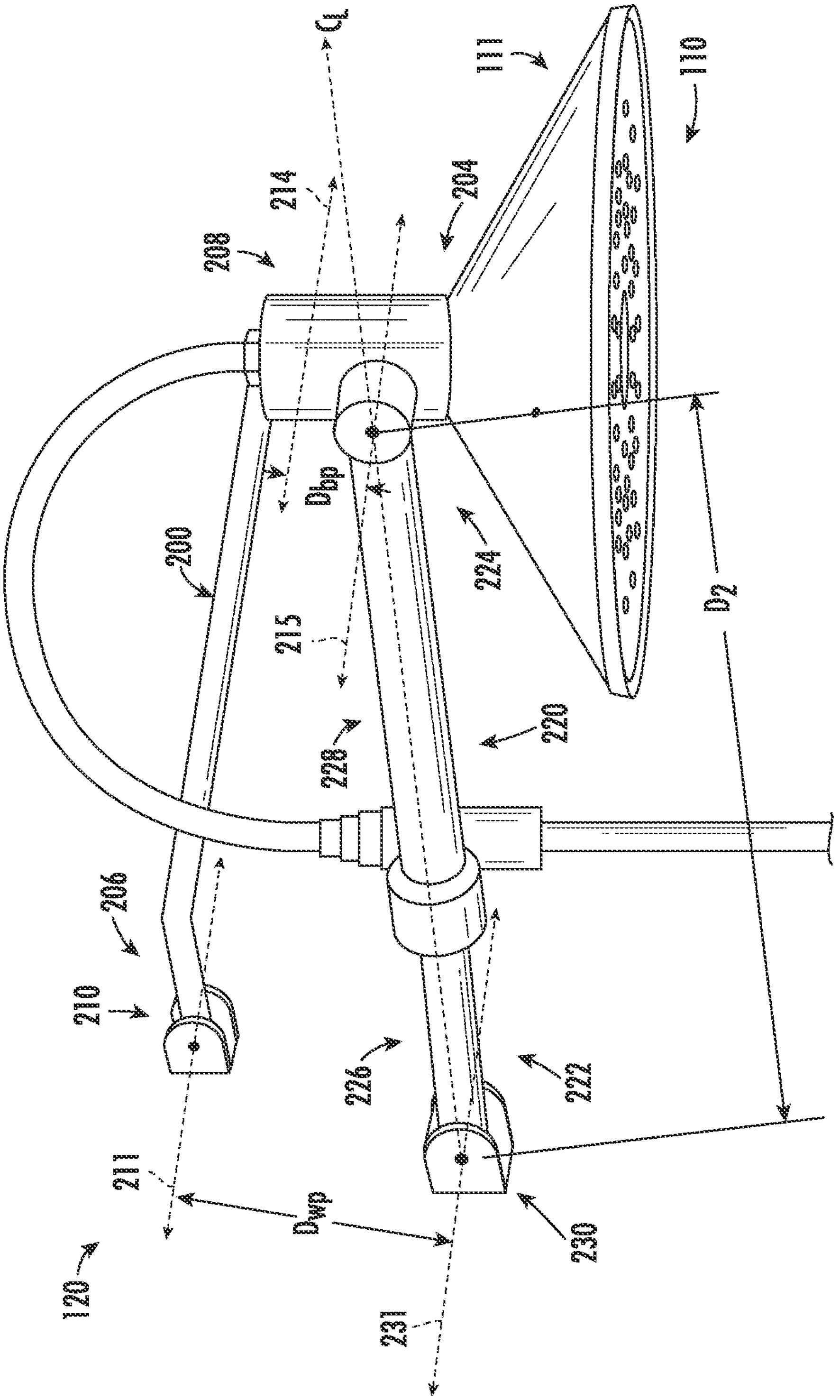
FIG. 4 is a detail view of a portion of the articulating shower assembly of FIG. 1.

Referring now to FIG. 4, a perspective view of the linkage assembly 120 is shown. The linkage assembly 120 includes a first link arm 200, a second link arm 220, and a pivot body 204. The first link arm 200 includes a first end 206 and a second end 208 opposite the first end 206. The first link arm 200 may be manufactured as a single body formed of stainless steel, chrome-plated plastic, chrome-plated metal alloy, plastic, wood, a polymer, or similar material. In some embodiments, the first link arm 200 is rigid such that it may not be easily manipulated, flexed, or bent under the forces required to move the articulating shower assembly 100 between the first position and the second position. The first link arm 200 is pivotally coupled to the wall 130 about the first end 206. In some embodiments, articulating shower assembly 100 includes a first wall block 210 coupled to the wall 130 and pivotally coupled to the first link arm 200 about the first end 206. The first link arm 200 is coupled to the first wall block 210 about a first wall pivot axis 211. Extending along the first wall pivot axis 211 may be a pin that extends through and couples together both the first wall block 210 and the first end 206. In some embodiments, the first wall pivot axis 211 extends through a bearing (e.g., ball bearing, roller bearing, etc.) that facilitates rotation between the first wall block 210 and the first link arm 200. In some embodiments, a bushing is used to facilitate rotation between the first link arm 200 and the first wall block 210. While the first wall block 210 allows for rotation of the first link arm 200 about the first wall pivot axis 211, the first wall block 210 prevents translational movement of the first link arm 200 in a direction generally away from the wall 130 or along the wall 130.

The first link arm 200 is also pivotally coupled to the pivot body 204 proximate the second end 208. As shown in FIG. 4, the first link arm 200 is pivotally coupled to the pivot body 204 about a first body pivot axis 214. Extending along the first body pivot axis 214 may be a pin that extends into and couples together both the pivot body 204 and the second end 208. In some embodiments, the first body pivot axis 214 extends through a bearing (e.g., ball bearing, roller bearing, etc.) that facilitates rotation between the pivot body 204 and the first link arm 200. In some embodiments, a bushing is used to facilitate rotation between the first link arm 200 and the pivot body 204. The pivot body 204 may rotate completely and continuously about the first body pivot axis 214 (e.g., may spin around the first body pivot axis 214 in the same rotational direction multiple times). In some embodiments, the pivot body 204 includes a stop to prevent continuous rotation of the pivot body 204 about the first body pivot axis 214 relative to the first link arm 200. Generally speaking, the linkage assembly 120 behaves similarly to a four-bar linkage, in some embodiments having a stop that cooperates with the first link arm 200 and the pivot body 204 to prevent the linkage assembly 120 from reversing on itself. Reversal of the linkage may cause damage to the linkage assembly 120 and make it difficult to operate the articulating shower assembly 100 between the first position and the second position.

The first link arm 200 defines a non-linear profile between the first wall pivot axis 211 and the first body pivot axis 214. More specifically, when the first link arm 200 is in the first position, the first end 206 extends away from the first wall block 210 in a direction generally perpendicular to the wall 130 for a short distance, then slightly bends downward toward the first body pivot axis 214. Proximate the second end 208, the first link arm 200 curves downward, defining a curve (e.g., bend), the second end 208 extending in a direction generally down and parallel to the wall 130. However, the first link arm 200 may define many different profiles. Generally, the shape, path, and profile of the first link arm 200 does not affect the operation of the articulating shower assembly so long as the first link arm 200 does not interfere with the wall 130, the spray head 110, the second link arm 220, or the pivot body 204 when the articulating shower assembly 100 is moved between the first position and the second position.

The second link arm 220 includes a first end 222 and a second end 224 opposite the first end 222. The second link arm 220 further defines a link axis $C_L$. Both the first end 222 and the second end 224 may lie on the link axis $C_L$. Speaking generally, the link axis $C_L$ may be perpendicular to the wall 130 when the articulating shower assembly 100 is in the first position. In some embodiments, the link axis $C_L$ may not be perpendicular to the wall 130 when the articulating shower assembly 100 is in the first position, but may be perpendicular to the wall 130 at some point as the articulating shower assembly 100 is moved between the first position and the second positon. In some embodiments, the link axis $C_L$ may not be perpendicular to the wall 130 at any point as the articulating shower assembly 100 is translated between the first position and the second position.

The second link arm 220 may be configured to be pivotally coupled to the wall 130 about first end 222. In some embodiments, articulating shower assembly 100 includes a second wall block 230 coupled to the wall 130 and pivotally coupled to the second link arm 220 about the first end 222. The second link arm 220 is coupled to the second wall block 230 about a second wall pivot axis 231. The second wall pivot axis 231 may be parallel to the first wall pivot axis 211. Extending along the second wall pivot axis 231 may be a pin that extends through and couples together both the second wall block 230 and the first end 222. In some embodiments, the second wall pivot axis 231 extends through a bearing (e.g., ball bearing, roller bearing, etc.) that facilitates rotation between the second wall block 230 and the second link arm 220. In some embodiments, a bushing is used to facilitate rotation between the second link arm 220 and the second wall block 230. While the second wall block 230 allows for rotation of the second link arm 220 about the second wall pivot axis 231, the second wall block 230 prevents translational movement of the second link arm 220 in a direction generally away from the wall 130 and generally along the wall 130.

A distance between the first wall pivot axis 211 and the second wall pivot axis 231 is shown as a wall pivot distance $D_{wp}$. The wall pivot distance $D_{wp}$ remains constant while the articulating shower assembly 100 transitions between the first position and the second position.

The second link arm 220 may also be configured to be pivotally coupled to the pivot body 204 proximate the second end 224. The second link arm 220 may be pivotally coupled to the pivot body 204 about a second body pivot axis 215. Extending along the second body pivot axis 215 may be a pin that extends into and couples together both the pivot body 204 and the second end 224. In some embodiments, the second body pivot axis 215 extends through a bearing (e.g., ball bearing, roller bearing, etc.) that facilitates rotation between the pivot body 204 and the second link arm 220. In some embodiments, a bushing is used to facilitate rotation between the second link arm 220 and the pivot body 204. The pivot body 204 may rotate completely and continuously about the second body pivot axis 215 (e.g., may spin around the second body pivot axis 215 in the same rotational direction multiple times). In some embodiments, the linkage assembly 120 includes a stop to prevent continuous rotation of the pivot body 204 about the second body pivot axis 215.

A distance between the first body pivot axis 214 and the second body pivot axis 215 is shown as a body pivot distance $D_{bp}$. The body pivot distance $D_{bp}$ remains constant while the articulating shower assembly is in the first position, is in the second position, and transitions between the first position and the second position. The wall pivot distance $D_{wp}$ may be greater than the body pivot distance $D_{bp}$.

The second link arm 220 may be configured to collapse (e.g., telescope, accordion, compress, etc.) such that a distance between the second body pivot axis 215 and the second wall pivot axis 231, shown as a second link distance $D_2$, may be increased or decreased while the second link arm 220 is still coupled to both the wall 130 and the pivot body 204. In some embodiments, the second link distance $D_2$ is less (e.g., shorter) when the articulating shower assembly 100 is in the first position than when the articulating shower assembly 100 is in the second position.

The second link arm 220 may include a first link portion 226 and a second link portion 228, where the first link portion 226 extends into the second link portion 228. In some embodiments, the second link portion 228 extends into the first link portion 226. In some embodiments, the first link portion 226 and the second link portion 228 have a friction interface (e.g., slide relative to each other). The friction interface may be lubricated (e.g., oiled). As the articulating shower assembly 100 is moved between the first position and the second position, the first link portion 226 and the second link portion 228 may slide relative to each other, facilitating the orientation of the spray head 110 and changing the second link distance $D_2$. To decrease the second link distance $D_2$, the second link portion 228 may move on the first link portion 226 in a direction along the link axis $C_L$ toward second wall block 230 (e.g., the first link portion 226 slides into the second link portion 228 and in a direction along the link axis $C_L$ and toward the second body pivot axis 215). To increase the second link distance $D_2$, the second link portion 228 may slide on the first link portion 226 in a direction along the link axis $C_L$ in a direction generally away from the second wall block 230 (e.g., the first link portion 226 slides into the second link portion 228 and in a direction along the link axis $C_L$ and away from the second body pivot axis 215).

In some embodiments, the second link arm 220 is pneumatic or hydraulic. The second link arm 220 is operable between a maximum extension and a minimum extension. When the second link arm 220 is in the minimum extension, the second link distance $D_2$ is the smallest allowed by the second link arm 220. When the articulating shower assembly 100 is in the second position, the second link arm 220 may have the minimum extension. When the second link arm 220 has the maximum extension, the second link distance $D_2$ is the greatest (e.g., longest) allowed by the second link arm 220. When the articulating shower assembly 100 is the first position, the second link arm 220 may have the maximum extension. In some embodiments, the second link arm 220 is in the maximum extension during the transition of the articulating shower assembly 100 between the first position and the second position. In some embodiments, the second link arm 220 does not achieve the maximum extension during operation of the articulating shower assembly 100 in the first position, the second position, or between the first position and the second position.

In some embodiments, the second link arm 220 may include a limit stop configured to limit (e.g., prevent) the extension and retraction of the second link arm 220. For example, when the linkage assembly 120 transitions from the first position to the second position, a limit stop may stop may be structured to stop the linkage assembly 120 in the second position and prevent the linkage assembly 120 from moving beyond the second position. In another example, when the linkage assembly 120 transitions from the second position to the first position, a limit stop may stop the linkage assembly in the first position and prevent movement of the linkage assembly 120 beyond the first position. The limit stop may also prevent damage to the second link arm 220. In some embodiments, the limit stop may prevent the second link portion 228 from being pulled apart in a direction generally away from the wall and separating the second link portion 228 from the first link portion 226.

In some embodiments, the second link arm 220 includes a spring structured to apply a force on the first link portion 226 in a direction toward the second link portion 228 such that the first link portion 226 and the second link portion 228 are difficult to separate from each other. In some embodiments, the friction interface between the first link portion 226 and the second link portion 228 is enough the hold the articulating shower assembly 100 in both the first position and the second position, but the friction interface is not so great that a user with wet hands cannot operate the articulating shower assembly 100. The friction interface between the first link portion 226 and the second link portion 228 may allow the articulating shower assembly 100 to be infinitely adjustable between the first position and the second position. In other words, the articulating shower assembly 100 may be positioned in the first position, the second position, and any position between the first position and the second position.

In some embodiments, the second link arm 220 may be manufactured as a single body formed of stainless steel, chrome-plated plastic, chrome-plated metal alloy, plastic, wood, a polymer, or similar material. In some embodiments, the second link arm 220 is rigid such that it may not be easily manipulated, flexed, or bent under the forces required to move the articulating shower assembly 100 between the first position and the second position.

As shown in FIG. 4, the second link arm 220 defines a linear profile between the second wall pivot axis 231 and the second body pivot axis 215. However, the second link arm 220 may define many different profiles. Generally, the shape, path, and profile of the second link arm 220 does not affect the operation of the articulating shower assembly 100 so long as the second link arm 220 is collapsible, extendable, and does not interfere with the wall 130, the spray head 110, the first link arm 200, or the pivot body 204 when the articulating shower assembly 100 is positioned between the first position and the second position. For example, the second link arm 220 may be a spring that is coupled to both the second wall pivot axis 231 and the second body pivot axis 215.

In some embodiments, the first link arm 200 and the second link arm 220 may switch places. More specifically, the second link arm 220 may be collapsible and coupled about the first wall pivot axis 211 and the first body pivot axis 214, and the first link arm 200 may be rigid and coupled about the second wall pivot axis 231 and the second body pivot axis 215. This may be desirable in some embodiments such that the articulating shower assembly 100 may be positionable between the first position and a third position, where the spray head 110 positioned in the third position is higher than (relative to the ground) the spray head 110 positioned in the first position. In the third positon, the spray head 110 may point in a direction generally away from the wall 130. In some embodiments, the articulating shower assembly 100 may be positionable in all of the first position, the second position, and the third positon.

Figure 5:
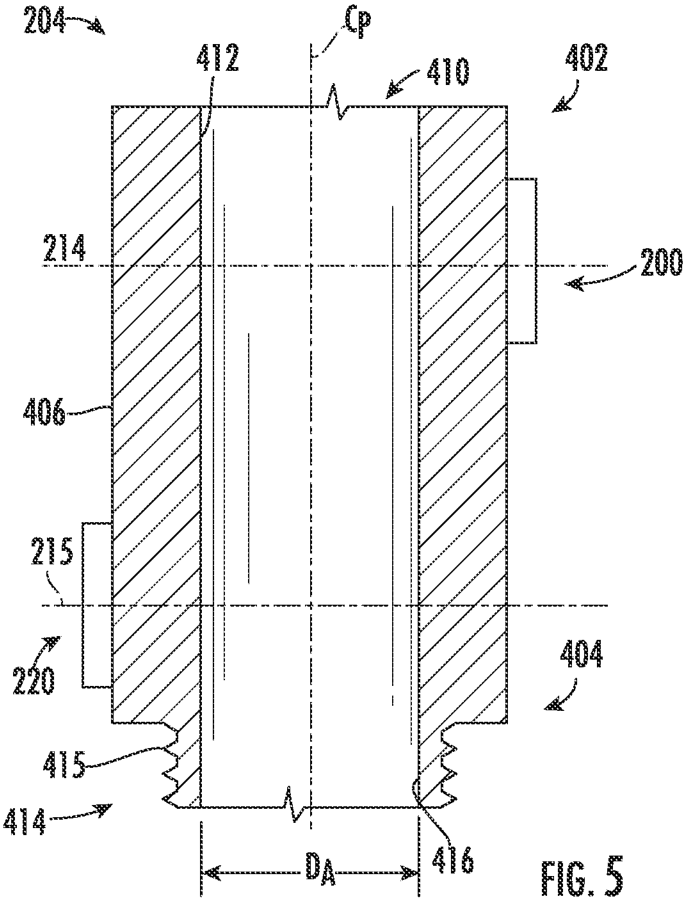
FIG. 5 is a cross-sectional view of a portion of the articulating shower assembly of FIG. 1.

Referring now to FIG. 5, a cross-sectional front view of the pivot body 204 is shown. The pivot body 204 defines a generally cylindrical body configured to receive a flow of water and provide the flow of water to the spray head 110 (e.g., the spray inlet 114). The pivot body 204 may be concentric about a central pivot axis $C_P$ When the articulating shower assembly 100 is in the first position, the central pivot axis $C_P$ may be parallel to the wall 130 and perpendicular to the link axis $C_L$. When the articulating shower assembly 100 is in the second position, the central pivot axis $C_P$ may intersect the wall 130 at a point between the ground and the second wall pivot axis 231. In some embodiments, when the articulating shower assembly 100 is in the second position, the central pivot axis $C_P$ may intersect the wall 130 at a point between the first wall pivot axis 211 and the second wall pivot axis 231. The pivot body 204 further includes a first pivot end 402 and a second pivot end 404 opposite to the first pivot end 402. The pivot body 204 further includes a generally annular outer pivot surface 406, extending between the first pivot end 402 and the second pivot end 404. The outer pivot surface 406 may be concentric about the central pivot axis $C_P$ The outer pivot surface 406 may further define a generally circular cross-section that remains constant between the first pivot end 402 and the second pivot end 404.

The pivot body 204 may further include a pivot aperture 410. The pivot aperture is configured to receive a flow of water and provide the flow of water to the spray head 110. The pivot aperture 410 extends through the pivot body 204 between the first pivot end 402 and the second pivot end 404. The pivot aperture 410 may be concentric about the central pivot axis $C_P$ The pivot aperture 410 is configured to receive and be fluidly coupled to a water conduit, such as a flexible hose, pipe, or similar conduit. The pivot aperture 410 defines an inner pivot surface 412. The inner pivot surface 412 may define a cylindrical cross-section defined by an aperture diameter DA, the aperture diameter DA remaining constant between the first pivot end 402 and the second pivot end 404.

Proximate the second pivot end 404 is a generally annular flange shown as a pivot flange 414. The pivot flange 414 projects away from the pivot body 204 in a direction generally along the central pivot axis $C_P$ The pivot flange 414 may be concentric about the central pivot axis $C_P$ and concentric about the inner pivot surface 412. In some embodiments, an inner surface of the pivot flange 414, shown as an inner flange surface 416, may be contiguous with the inner pivot surface 412, having the same aperture diameter DA and defining a cylindrical cross-section. In some embodiments, the inner flange surface 416 may define a diameter greater than or less than the aperture diameter DA.

The pivot flange 414 is structured to couple the spray head 110 to the pivot body 204. In some embodiments, the pivot flange 414 includes pivot threads 415 extending away from the pivot flange 414. The pivot flange 414, and thus the pivot threads 415, may be threadingly coupled to the spray threads 119 such that a watertight seal may be formed between the pivot flange 414 and the spray threads 119. In some embodiments, the pivot body 204, and more specifically the pivot flange 414, may be configured to be fluidly coupled to a shower head swivel ball adaptor. Instead of being rigidly coupled to the spray head 110, the shower head swivel ball adaptor allows the spray head 110 to be positionable (as by swiveling or rotating) relative to the pivot body 204. For example, if the shower head swivel ball adaptor is used to fluidly couple the pivot body 204 to the spray head 110, the spray head 110 may be positionable without changing the position of the pivot body 204, and thus not changing the position of the articulating shower assembly 100. In another example, if the pivot flange 414 is coupled to the spray threads 119, a force applied to the spray head 110 will be translated to the pivot body 204, and thus any positioning of the spray head 110 results in a similar positioning of the pivot body 204, and thus the articulating shower assembly 100.

Pivotally coupled to the pivot body 204 are the first link arm 200 and the second link arm 220. The second link arm 220 is shown as being coupled to an opposite "side" of the pivot body 204 from the first link arm 200. More specifically, the second link arm 220 is pivotally coupled to the pivot body 204 proximate the outer pivot surface 406 180-rotational-degrees, relative to the central pivot axis $C_P$ from where the first link arm 200 is pivotally coupled to the pivot body 204 proximate the outer pivot surface 406. This may be desirable in some embodiments such that the first link arm 200 and the second link arm 220 do not interface when the articulating shower assembly 100 is moved between the first position and the second position. This allows for greater flexibility in the shape, size, and path of the first link arm 200 and the second link arm 220.

Figure 6:
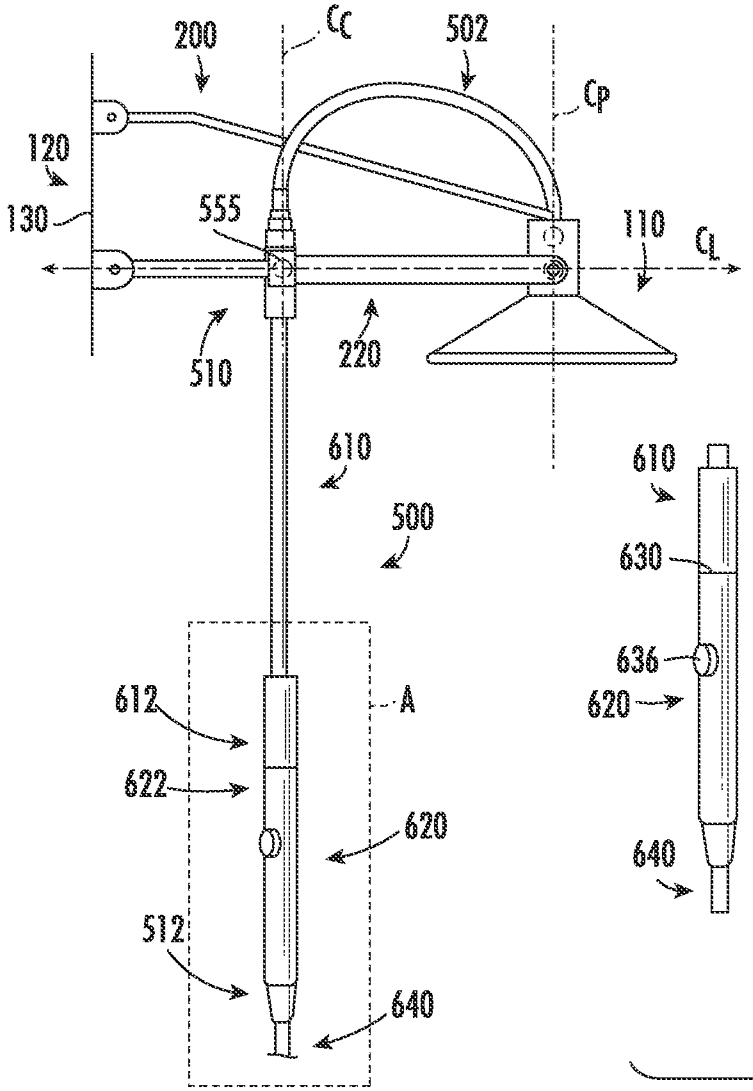
FIG. 6 is a side-view of the articulating shower assembly of FIG. 1.

Referring now to FIG. 6, a handle 500 is shown having a first handle end 510 pivotally coupled to the second link arm 220 and a second handle end 512 opposite the first handle end 510, the second handle end 512 fluidly coupled to a water conduit, such as a flexible hose. A flow of water may exist within the handle 500 such that the first handle end 510 is in fluid communication with the second handle end 512. In some embodiments, the handle 500 is rotatably coupled to the second link arm 220 such that the handle 500 may make multiple complete rotations in the same direction relative to the second link arm 220. The handle 500 may be rotatably coupled to the second link portion 228 about a handle pivot axis 555. In some embodiments, a portion of the handle 500 extends above and below the second link arm 220.

The handle 500 is in fluid communication with the pivot body 204 and the spray head 110. Fluidly coupling the handle 500 to the pivot body 204 is a flexible conduit, shown as a hose 502. The hose 502 may be manufactured from PVC, metal, synthetic rubber, natural rubber, an elastomer, a polymer, or similar materials or combinations of materials. The hose 502 is configured to flex and bend as the articulating shower assembly 100 moves between the first position and the second position. In some embodiments, the hose 502 includes an outer wire braiding such that the hose 502 is able to withstand the cyclic loading caused by the transition of the articulating shower assembly 100 between the first position and the second position.

The handle 500 may define a generally cylindrical body concentric about a central coupling axis Cc. When the articulating shower assembly 100 is in the first position, the central coupling axis Cc may be parallel to the wall 130 and may be perpendicular to the link axis $C_L$. When the articulating shower assembly is in the second position, the central coupling axis Cc may be parallel to the wall 130. Generally speaking, the handle 500 is pivotally coupled to the second link arm 220 such that the central coupling axis Cc may remain parallel to the wall 130 when the articulating shower assembly 100 is in the first position, in the second position, and transitioning between the first position and the second position. In some embodiments, the central coupling axis Cc is parallel to the wall 130 when the articulating shower assembly 100 is in the first position, the third position, and transitioning between the first position and the third position. In some embodiments, the central coupling axis Cc is parallel to the central pivot axis $C_P$ when the articulating shower assembly 100 is in the first position.

Generally speaking, the articulating shower assembly 100 is configured to transition from the first position to the second position when a force is applied to the handle 500 along the central coupling axis Cc in a direction toward the ground. The articulating shower assembly 100 may be configured to transition from the second positon to the first positon when a force is applied to the handle 500 along the central coupling axis Cc in a direction generally toward the linkage assembly 120 (e.g., the second link arm 220).

The handle 500 may be rigid enough such that a force may be applied to the handle 500 in a direction generally toward the handle pivot axis 555 without the handle 500 deforming. In some embodiments, slight flexure of the handle 500 may occur when the force is applied.

The handle 500 may further include a first handle portion 610 and a second handle portion 620 (e.g., wand, handheld sprayer, etc.). The first handle portion 610 and the second handle portion 620 may be in fluid communication with each other and with the pivot body 204. The second handle portion 620 may be removably coupled to the first handle portion 610. The handle 500 is configured to be operable in a first coupling position and a second coupling position. In the first coupling position, the first handle portion 610 is fluidly coupled to the second handle portion 620 such that a flow of water received by the second handle portion 620 is delivered to the spray head 110. In the second coupling position, the first handle portion 610 is not coupled to and not in fluid communication with the second handle portion 620. In the second coupling positon, water received by the second handle portion 620 is ejected out of the second handle portion 620 and into the shower environment (e.g., water is not delivered from the second handle portion 620 to either the first handle portion 610 or the spray head 110). Generally, when the handle is in the first coupling position, the second handle portion 620 is in fluid communication with the spray head 110 and configured to deliver a flow of water to the spray head 110. When the handle 500 is in the second coupling position, the second handle portion 620 is not in fluid communication with the spray head 110 and water does not exit the spray head 110.

Figure 7:
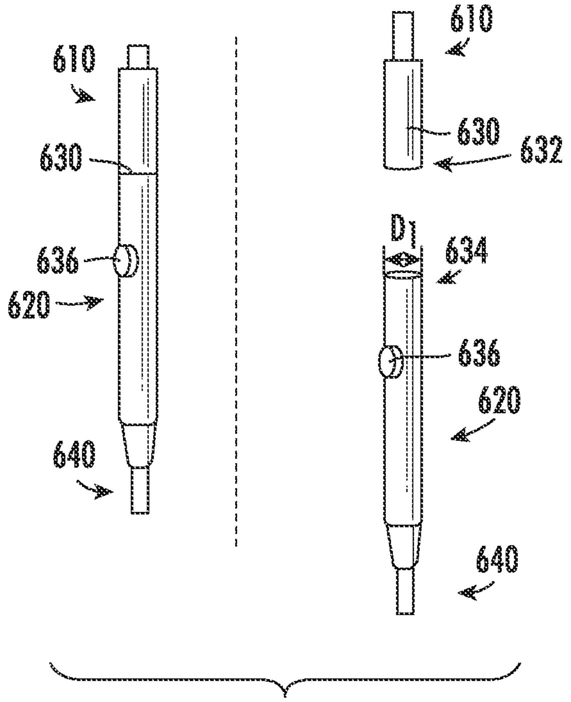
FIG. 7 is a detail view of Portion A of FIG. 6.

Referring now to FIG. 7, a zoomed-in view of a portion of the handle 500 as shown in Portion A in FIG. 6 is shown. The first handle portion 610 may be pivotally coupled to the second link arm 220 (e.g., the second link portion 228) about the handle pivot axis 555 while the second handle portion 620 is removably coupled to the first handle portion 610. A user of the articulating shower assembly 100 may decouple the second handle portion 620 from the first handle portion 610 using a quick release connector 630 integrated within the first handle portion 610 proximate a first portion outlet 632. In some embodiments, the quick release connector 630 is an M-style quick connect coupler, In some embodiments, the quick release connecter 630 is a quick connect hose fitting having a collet-style fitting. The quick release connector 630 may eliminate the need for a diverter that redirects a flow of water between the spray head 110 and a handheld sprayer (e.g., shower wand, the second handle portion 620). This is advantageous as mechanical parts are eliminated from the system that can be expensive and require maintenance. Further, as a diverter is not needed, the articulating shower assembly 100 is able to be positioned in environments that may be too remote for traditional plumbing and a traditional diverter. For example, the articulating shower assembly may be mounted to a tree so long as a flow of water is provided to the second handle portion 620.

In some embodiments, the quick release connector 630 is integrated within the second handle portion 620 proximate a second portion outlet 634. A user may operate the quick release connector 630 and decouple the second handle portion 620 from the first handle portion 610 while water is flowing through the handle 500. A user may also operate the quick release connector 630 to fluidly couple the first handle portion 610 to the second handle portion 620 while water is flowing through the second handle portion 620 and exiting the second portion outlet 634.

Disconnecting the second handle portion 620 disrupts the continuity between the second handle portion 620 and the spray head 110. Thus, the flow of water stops flowing through the spray head 110 and now exits through the second portion outlet 634. Once decoupled from the first handle portion 610, the second handle portion 620 may be used similar to how a shower wand or handheld sprayer may be used.

The second handle portion 620 may further include a control switch 636, configured to change a characteristic of a flow of water exiting the second handle portion 620. The control switch 636 may be operatively coupled to a diverter positioned within the second handle portion 620, the diverter configured to change a characteristic of the flow of water exiting the second handle portion 620. For example, when the second handle portion 620 is coupled to the first handle portion 610, the diverter may be operable in a position to increase the flow rate of water flowing through the second handle portion 620 and reaching the spray head 110. When the second handle portion 620 is decoupled from the first handle portion 610, a user may interface with the control switch 636 to change a characteristic of the flow of water exiting the second handle portion 620. For example, the control switch 636 may constrict the flow of water exiting the second handle portion 620, increasing the velocity of the flow of water. In some embodiments, user interaction with the control switch 636, such as by pressing the control switch 636, may change a spray pattern of the flow of water exiting the second handle portion 620. In some embodiments, the control switch 636 is a mechanical button configured to actuate a diverter positioned within the second handle portion 620.

The first handle portion 610 may be formed of a first portion material, such as plastic, rigid plastic, metal, or a similar material.

The second handle portion 620 includes the second handle end 512 and a second handle portion end 622. The second handle portion end 622 is configured to be fluidly coupled to the first handle portion end 612 such that a watertight seal is formed between the second handle portion 620 and the first handle portion 610. When the second handle portion 620 is fluidly coupled to the first handle portion 610 (e.g., when the handle is in the first coupling position), the handle 500 behaves similar to a pipe, allowing an uninhibited flow of water to pass through from the second handle portion 620 to the spray head 110. In some embodiments, the second handle portion 620 may include an aerator that aerates the flow of water that exists the second handle portion 620. The second handle portion 620 may be formed of a second portion material, such as metal, chrome-plated plastic, plastic, or a similar material. The first portion material may be different from the second portion material.

The second handle portion 620 may define a generally annular body having a cylindrical cross-section that is easily gripped by a user within the shower environment. In some embodiments, the second handle portion 620 includes a series of ribs or bumps along an outside surface of the second handle portion 620 which help a user to grip the second handle portion 620 with wet hands. The second handle portion 620 may have a cross-section of a first diameter $D_1$. Proximate the second handle end 512, the second handle portion 620 may tapper slightly to a small diameter, less than the first diameter $D_1$. Proximate to the first portion outlet 632, the first handle portion 610 may define a generally cylindrical cross-section having the first diameter $D_1$ to provide an astatically pleasing design.

In some embodiments, the second handle portion 620 may include a diverter or valve that is structure to be selectively positioned to prevent a flow of water from flowing through the second portion outlet 634. In some embodiments, the diverter is configured to be positioned to directed the flow of water out of a series of apertures profiled along the outside of the second handle portion 620.

The second handle portion 620 may be fluidly coupled to a conduit, shown as a conduit 640. The conduit 640 is configured to receive a flow of water and provide the flow of water to the handle 500 (e.g., to the second handle portion 620, to the second handle end 512). The conduit 640 may be a hose, such as a flexible hose, a rubber hose, or a braided hose. The conduit 640 may be formed of a material that is resistant to corrosion, such as latex, silicone, rubber, or similar materials used for soft and flexible hoses in a shower environment. In some embodiments, the conduit 640 may have rigid segments fluidly coupled together by ball joints (similar to the shower swivel joint adaptor) or similar joints. The conduit 640 is structured to be positionable. For example, when a force is applied to the handle 500 in a direction generally toward the linkage assembly 120, the conduit 640 may flex and bend so such upward movement of the handle 500 is facilitated. As another example, the second handle portion 620 may be decoupled from the handle 500 (e.g., the first handle portion 610) when the user of the shower environment desires to use the second handle portion 620 as a shower wand. The conduit 640 may flex and bend such that a user of the second handle portion 620 may aim the second portion outlet 634 at each part of their body, including under their feet and behind their head. In some embodiments, the conduit 640 may be adjustable or replaceable. For example, a user may only wish to disconnect the second handle portion 620 from the handle 500 so they can wash the tops of their feet, such as to rinse sand or mud off their feet or shoes. In such an embodiment, the user may prefer a shorter conduit 640 since a longer conduit 640 may get in the way. As another example, a user may desire to use the second handle portion 620 to wash the walls within the shower environment, to wash garden tools, or even to rinse a car in a garage. In such an embodiment, it may be desirable to have a longer conduit 640.

In some embodiments, the conduit 640 is retractable into (e.g., behind) the wall 130. The conduit 640 may be as long as 10 feet, but only a small portion (e.g., 18 inches, etc.) of the conduit 640 may be positioned in the shower environment when the handle 500 is in the first coupling position (e.g., when a user of the articulating shower assembly 100 wishes to send water to and use the spray head 110). In some embodiments, 10 feet of the conduit 640 may be within the shower environment when the handle 500 is in the second coupling position (e.g., when the user disconnects the second handle portion 620 from the first handle portion 610 so that water exits the second handle portion 620, such as to rinse garden tools or a car).

The conduit 640 may be fluidly coupled to a valve (e.g., utility valve, water source, etc.), shown as a valve 700. The valve 700 is configured to receive a flow of water from and provide the flow of water to the conduit 640. The valve 700 defines a generally annular body having an outer valve surface 702 and a valve face 704. The valve 700 may include a hose coupling 706. The hose coupling 706 may be fluidly coupled to the conduit 640. The hose coupling 706 may extend radially from the valve 700 (e.g., the outer valve surface 702). In some embodiments, the valve 700 is coupled to the wall 130, the same wall the linkage assembly 120 is coupled to. In some embodiments, the valve 700 is coupled to a vertical surface different from the wall 130. For example, if a shower environment includes the wall 130 and a side wall perpendicular to the wall 130, the valve 700 may be coupled to the side wall. This may be desirable, in some embodiments, as coupling the valve 700 to the side wall may increase the range of motion of the second handle portion 620 when disconnected from the handle 500. For example, perhaps an installer prefers to install the articulating shower assembly 100 on 'wall A,' but the utility conduit is on 'wall B,' such as near a commercial sink, garage sink, spigot, or the like. Instead of rerouting the plumbing to have the utility conduit output at 'wall A,' the valve 700 may be positioned at the utility outlet at 'wall B,' with the conduit 640 extending to the handle 500 pivotally coupled to the linkage assembly 120 of the articulating shower assembly 100. This may be useful in a garage, gardener's shower, a beach home shower, an outdoor shower, or similar shower.

Figure 8:
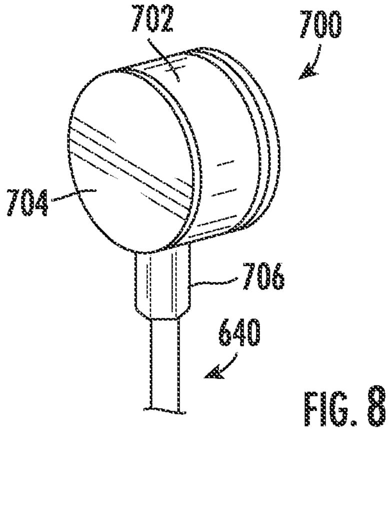
FIG. 8 is a detail view of a portion of the articulating shower assembly of FIG. 1.

In some embodiments, the valve 700 is rotatably coupled to the wall 130 (e.g., the side wall, a vertical surface, etc.) such that the hose coupling 706 is positionable within the shower environment. As shown in FIG. 8, the valve 700 is positioned such that the hose coupling 706 points in a direction generally away from the articulating shower assembly 100 and the conduit 640 extends toward the floor before forming a 'U' and extending toward the linkage assembly. Since the hose coupling 706 points toward the floor, the conduit 640 must bend back toward the handle 500. In embodiments where the valve 700 is rotatable relative to the wall 130, a user of the second handle portion 620 may be given a greater range of motion when the handle 500 is in the second coupling position (e.g., when the second handle portion 620 is removed from the handle 500 and decoupled from the first handle portion 610). This may be desirable, in some embodiments, such that the conduit 640 may be shorter, saving materials. The rotatability of the valve 700 may be the equivalent of a longer conduit 640.

In some embodiments, the articulating shower assembly 100 and the handle 500 may be sold separately from the conduit 640. For example, the second handle portion 620 may be configured to be fluidly coupled to an existing conduit, such as a garden hose or an old pre-existing conduit. When the second handle portion 620 is fluidly coupled to a garden hose, the garden hose may deliver a flow of water to the spray head 110 when the handle 500 is in the first coupling position. When the handle 500 is in the second coupling position, the second handle portion 620, while fluidly coupled to the garden hose, may be used to water plants, wash the car, or complete other garden hose related activities.

The first handle portion 610 may be structured to receive a cap or stopper proximate the first portion outlet 632, the cap or stopper structured to prevent debris and foreign bodies from entering the first handle portion 610 via the first portion outlet 632 when the handle 500 is in the second coupling position. For example, if the articulating shower assembly 100 is installed in a garage or gardener's shower, it may sit unused for months at a time (e.g., during the winter), and the cap or stopper may be used to keep the handle 500 and the articulating shower assembly 100 clean and operable for when the handle 500 is operable in the first coupling positon, such as during the spring (e.g., gardening months). The second handle portion 620, and more specifically the second portion outlet 634, may be structured to accept a similar cap or stopper to the one operable with the first handle portion 610.

While this specification contains many specific implementation details, these should not be construed as limitations on the scope of what may be claimed but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described as acting in certain combinations and even initially claimed as such, one or more features from a claimed combination can, in some cases, be excised from the combination, and the claimed combination may be directed to a subcombination or variation of a subcombination.

As utilized herein, the term "approximately," "generally," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the present disclosure as recited in the appended claims.

The term "coupled" and the like, as used herein, mean the joining of two components directly or indirectly to one another. Such joining may be stationary (e.g., permanent) or moveable (e.g., removable or releasable). Such joining may be achieved with the two components or the two components and any additional intermediate components being integrally formed as a single unitary body with one another, with the two components, or with the two components and any additional intermediate components being attached to one another.

It is important to note that the construction and arrangement of the system shown in the various example implementations is illustrative only and not restrictive in character. All changes and modifications that come within the spirit and/or scope of the described implementations are desired to be protected. It should be understood that some features may not be necessary, and implementations lacking the various features may be contemplated as within the scope of the application, the scope being defined by the claims that follow. When the language "a portion" is used, the item can include a portion and/or the entire item unless specifically stated to the contrary.

Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

Additionally, the use of ranges of values (e.g., W to P, etc.) herein are inclusive of their maximum values and minimum values (e.g., W to P includes W and includes P, etc.), unless otherwise indicated. Furthermore, a range of values (e.g., W to P, etc.) does not necessarily require the inclusion of intermediate values within the range of values (e.g., W to P can include only W and P, etc.), unless otherwise indicated.

What is claimed is:

1. An articulating shower assembly comprising: a linkage assembly configured to be operable in a plurality of positions; a spray head coupled to the linkage assembly and operable in the plurality of positions; and a handle pivotally coupled upstream to the linkage assembly; wherein the linkage assembly is configured to transition between the plurality of positions responsive to a force applied to the handle; and wherein the linkage assembly is pivotally coupled to the spray head such that the force applied to the handle causes the spray head to pivot relative to the linkage assembly when transitioning between the plurality of positions and spray fluid in different directions in different positions of the plurality of positions.

2. The articulating shower assembly of claim 1, wherein the linkage assembly comprises a first link arm, a second link arm, and a pivot body, the pivot body fluidly coupled to the spray head.

3. The articulating shower assembly of claim 2, wherein the first link arm is rigid and the second link arm is structured to extend and collapse.

4. The articulating shower assembly of claim 1, wherein the handle is in fluid communication with the spray head.

5. The articulating shower assembly of claim 1, wherein the handle includes a wand, the wand removably coupled to the handle.

6. The articulating shower assembly of claim 5, wherein the wand is removably coupled to the handle using a quick release connector.

7. An articulating shower assembly comprising: a linkage assembly configured to be operable in a first position and a second position; a spray head pivotally coupled to the linkage assembly such that the linkage assembly causes the spray head to spray fluid in a first direction in the first position and spray the fluid in a second, different direction in the second position; and a handle comprising: a first handle portion pivotally coupled upstream to the linkage assembly; and a second handle portion removably and fluidly coupled upstream to the first handle portion.

8. The articulating shower assembly of claim 7, wherein the first handle portion is in fluid communication with the spray head.

9. The articulating shower assembly of claim 8, wherein the handle is operable in a first coupling position and a second coupling position, the second handle portion in fluid communication with the spray head in the first coupling position, and the second handle portion separate from the first handle portion in the second coupling position.

10. The articulating shower assembly of claim 7, wherein the second handle portion includes an aerator proximate an outlet of the second handle portion.

11. The articulating shower assembly of claim 7, further comprising:

a valve configured to be rotatably coupled to a wall and configured to provide a flow of water; and a conduit structured to receive the flow of water from the valve and provide the flow of water to the second handle portion.

12. The articulating shower assembly of claim 7, wherein the linkage assembly is configured to transition between the first position and the second position responsive to a force applied to the handle.

13. The articulating shower assembly of claim 7, wherein the linkage assembly is configured to transition between the first position and the second position responsive to a force applied to the first handle portion when the second handle portion is in fluid communication with the spray head.

14. The articulating shower assembly of claim 7, wherein the linkage assembly includes an expanding link, the expanding link configured to expand and contract as the linkage assembly transitions between the first position and the second position.

15. The articulating shower assembly of claim 14, wherein the handle is pivotally coupled to the expanding link.

16. The articulating shower assembly of claim 7, wherein the linkage assembly is a four-bar linkage.

17. The articulating shower assembly of claim 7, further comprising a conduit configured to receive a flow of water from the handle and deliver the flow of water to the spray head when the linkage assembly is in either of the first position or the second position.

18. An articulating shower assembly comprising: a linkage assembly operable in a first position and a second position, the linkage assembly comprising: a pivot body; a first link pivotally coupled to the pivot body and configured to be pivotally coupled to a wall; and a second link pivotally coupled to the pivot body and configured to be pivotally coupled to the wall; and a spray head fluidly coupled to the pivot body; and a handle pivotally coupled upstream to the second link; wherein the linkage assembly is configured to transition between the first position and the second position responsive to a force applied to the handle; and wherein transitioning the linkage assembly between the first position and the second position causes the spray head to transition between a first orientation in which the spray head sprays fluid at a first angle relative to the wall and a second orientation in which the spray head sprays fluid at a second, different angle relative to the wall.

19. The articulating shower assembly of claim 18, further comprising a conduit fluidly coupled between the handle and the pivot body.

20. The articulating shower assembly of claim 18, wherein the second link expands and collapses as the linkage assembly transitions between the first position and the second position.

* * * * *